Figure 1:
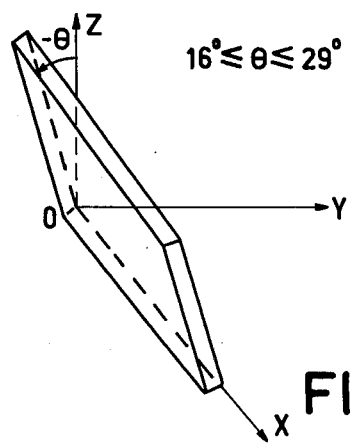

United States Patent [19]

Franx

[11] Patent Number: 4,472,656
[45] Date of Patent: Sep. 18, 1984

[54] TEMPERATURE SENSOR AND METHOD USING A SINGLE ROTATED QUARTZ CRYSTAL

[75] Inventor: Cornelis Franx, Eindhoven, Netherlands

[73] Assignee: U.S. Philips Corporation, New York, N.Y.

[21] Appl. No.: 507,900

[22] Filed: Jun. 27, 1983

[30] Foreign Application Priority Data

Jul. 1, 1982 [NL] Netherlands ............ 8202649

[51] Int. Cl.³ .................................... H01L 41/08
[52] U.S. Cl. ..................... 310/361; 310/311; 310/353; 374/117
[58] Field of Search ........ 310/360, 361, 311, 315–318; 331/116 R, 153, 154; 374/117

[56] References Cited

U.S. PATENT DOCUMENTS

| 2,496,975 | 2/1950 | Bach | 374/117 X |
| 2,536,025 | 1/1951 | Blackburn | 374/117 X |
| 2,721,267 | 10/1955 | Collins | 374/117 X |
| 3,263,103 | 7/1966 | Fraser et al. | 310/361 |
| 4,160,183 | 7/1979 | Kusters et al. | 310/361 X |
| 4,355,257 | 10/1982 | Kawashima et al. | 310/361 |

FOREIGN PATENT DOCUMENTS 0067590 6/1977 Japan .................. 310/361

Primary Examiner—Mark O. Budd
Attorney, Agent, or Firm—Bernard Franzblau

[57] ABSTRACT

A temperature sensor including an oscillator circuit comprising a plate-shaped quartz crystal resonator formed using a cut rotated singly through an angle $\theta$ about the X axis, $\theta$ being in the range $-29°$ to $-16°$ or $+39°$ to $+45°$. Electrodes are provided on the major surfaces of the resonator to make the resonator vibrate in a thickness shear mode at a frequency which varies substantially linearly in a selected temperature range.

13 Claims, 5 Drawing Figures

TEMPERATURE SENSOR AND METHOD USING A SINGLE ROTATED QUARTZ CRYSTAL

The invention relates to a temperature sensor including an oscillator circuit comprising a crystal resonator in the form of a substantially plane-parallel plate cut from a quartz crystal, the crystal resonator having, in response to an electric field, a mode of oscillation with a substantially linear frequency-temperature characteristic over a selected temperature range, and electronic oscillator means to generate and apply the electric field to the crystal resonator.

Such a temperature sensor is disclosed in U.S. Pat. No. 4,079,280.

The said United States patent discloses a temperature measuring method in which use is made of the substantially linear frequency-temperature characteristic in the temperature range between −20° C. and 50° C. of a quartz crystal resonator having a (yxwl) 21.93°/33.93° orientation which is made to vibrate in a given mode (B mode or so-called fast shear mode).

The advantages of temperature measurement using a piezoelectric crystal when compared with such measurement using other sensors which provide an electrical signal (resistance sensor, thermocouple), are a high accuracy and the possibility of direct digital processing of the measured values.

The said other kinds of temperature sensors provide an analogue output. Said output may be a low voltage in the case of a thermocouple or of a measurement output relating to resistance from, for example, a Pt resistance thermometer. This output is first converted, by means of a circuit which is sometimes termed a transmitter, into a normalised information stream and is then multiplexed and converted via an A/D converter into digital information if a microprocessor is to be used for further processing.

This results in the said sensors being expensive to use, while a further disadvantage is that each converter will involve a loss of accuracy. Thus a sensor is to be preferred which provides digital information directly. A disadvantage of the above-mentioned known sensor which uses a crystal resonator, however, is that the resonator in question is difficult to make in a reproducible manner in mass production since it requires a doubly rotated cut. Moreover, a strong unwanted resonance proves to be present close to the main resonance, which necessitates a more complex design of the oscillator. It is an object of the invention to provide a temperature sensor with a crystal resonator having a singly-rotated cut with a substantially linear frequency-temperature characteristic over a selected temperature range.

This object is achieved in that the temperature sensor of the kind described in the opening paragraph comprises a crystal resonator in the form of a crystal resonator plate formed using a crystal cut rotated singly through an angle $\theta$ about the X axis (piezoelectric axis) of the crystal, $\theta$ being in one of the ranges $-29° \leq \theta \leq -16°$ and $+39° \leq \theta \leq +45°$ and that the major faces of the plate are provided with respective electrodes to make the plate vibrate in a thickness shear mode.

The sign of the angle $\theta$ conforms with the IRE standards on piezoelectric crystals (1949) published in the Proceedings of the IRE, Volume 37, pp. 1378-95. December, 1949.

It has been found that the resonators having a singly-rotated crystal cut thus selected (which ensures a manufacture in large numbers with good reproducibility and at comparatively low costs), dependent on the angle over a given part of the temperature range of approximately −25° C. to approximately 275° C., combines a very linear, temperature-frequency variation wiht a sufficiently large temperature coefficient. Over a temperature range of 20° to 80° C. the most linear variation is found at an angle $\theta$ of −26°. Over the temperature range from 0° C. to 150° C. at an angle of −23°. Over the temperature range from −25° C. to 95° C. at an angle of −28°. Over a temperature range from 50° to 275° C. at angles of −17° and +43°.

The invention also relates to a crystal resonator for a temperature sensor as described above.

Figure 2:
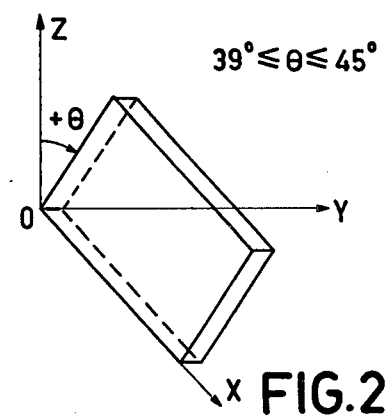
Figure 3A:
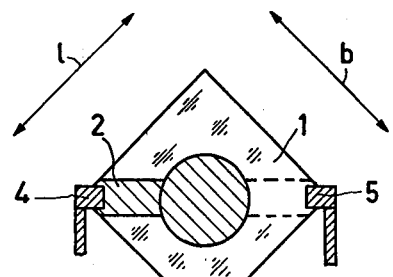
Figure 3B:
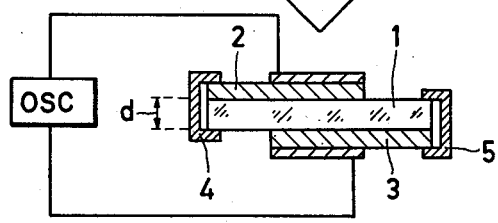
Figure 4:
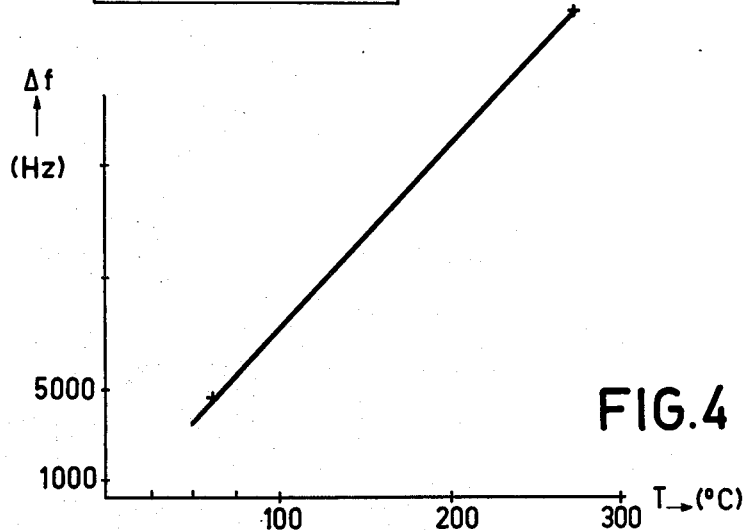

An embodiment of the invention will be described by way of example with reference to the drawing, in which FIG. 1 shows a first orientation of a quartz crystal resonator, FIG. 2 shows a second orientation of a crystal resonator, FIGS. 3a and 3b are a plan view and a cross-sectional view, respectively, of a crystal resonator having electrodes for use in an oscillator circuit, and FIG. 4 shows a plot of the frequency deviation $\Delta f$ versus the temperature T for a crystal resonator having the orientation shown in FIG. 2.

The two main properties which have made quartz so successful are the piezoelectric effect in the material as a result of which mechanical displacements can be associated interactively with electrical variations, and the very low damping factor associated with mechanical oscillations. The piezoelectricity is directly associated with the crystal structure. In FIG. 1 the usual axes of a quartz crystal are shown. The Z axis, the optical axis, is an axis of three-fold symmetry, the X-axis, the piezoelectric axis, is one of the three equivalent axes of two-fold symmetry. It is known that the sensitivity of the resonant frequency of a quartz crystal with respect to temperature depends on the orientation with which a quartz plate has been cut from the crystal. A once-rotated cut is obtained by rotating the cut from a plane perpendicular to the Y axis (the "Y" cut) through an angle $\theta$ about the X axis. The cut according to the invention has been rotated once counter-clockwise ($-29° \leq \theta \leq 16°$: FIG. 1) or rotated once clockwise ($39° \leq \theta \leq 45°$: FIG. 2). These cuts prove to give rise to a predominantly linear frequency-temperature characteristic in selected temperature ranges. FIG. 3a is a plan view of a quartz crystal resonator with electrodes and FIG. 3b is a cross-sectional view thereof. Quartz crystal 1 has the form of a plane-parallel plate of thickness d. The resonant frequency is substantially determined by the thickness of the plate but is reduced slightly by the mass of electrodes 2 and 3. As a result the central part has a slightly different resonant frequency from the surrounding part. This weakens the coupling of the central part with respect to the holder parts 4 and 5 between which the crystal plate 1 is clamped: the energy is trapped at the centre ("energy trappine"). Thus the Q factor becomes higher as a result of the presence of the electrode material. FIGS. 3a and 3b are not drawn to scale for reasons of clarity. In fact, the thickness d of the crystal plate 1 is very small. It is, for example, a few tenths of a millimeter, while the main dimensions l and b are each, for example, 10 mm.

In order to ensure that the crystal resonator 1, provided with two electrodes and clamped in the manner shown in FIGS. 3a and 3b, has a substantially linear frequency-temperature characteristic in a selected temperature range, it is cut to an orientation as shown in FIG. 1 or in FIG. 2.

It is achieved by the manner of clamping shown that, when an H.F. electric field of suitable frequency is applied to the electrodes 2 and 3, the resonator 1 will vibrate in a so-called thickness shear mode.

In flat crystal plates there are three major vibration modes. These are "thickness vibrations": acoustic standing waves over the thickness of plate. They are indicated by a, b and c in the sequence of decreasing wave speed. In single cuts the displacements in mode a are longitudinal (this is a displacement perpendicular to the plate) and in modes b and c they are transversal to the plate (shear).

EXAMPLE

A (hydrothermally grown) quartz crystal from which the plates are to be sawn is clamped with one degree of freedom in the desired orientation in a sawing machine after determining the crystal axes. The orientation is checked by means of X-ray diffraction to an accuracy of approximately 0.01° in $\theta$. In the present case $\theta$ was adjusted to be 43° 00. After sawing, the plates are lapped to approximately the correct thickness between lapping disks. During the lapping process the plates are accommodated in small holes in a sheet of synthetic resin. A radio receiver connected to the lapping disks gives a signal when the required frequency is reached.

In the present case the plates are ground to a thickness of 326 μm so as to make resonators for a nominal frequency of 8.85 MHz which will operate at the fundamental of the b mode. The present type of resonators operate generally at frequencies between 1 and 250 MHz. The plates are then stacked, ground to the desired shape, separated from each other and etched. Etching is necessary to remove the damage resulting from lapping and to prepare the surface for the vapour deposition of the electrodes. The electrodes are, for example, of silver or gold. When they have been applied, each of the plates is mounted in its holder. The assembly is provided with a glass envelope which is evacuated, or is provided with a metal envelope which is filled with gas.

The frequency-temperature characteristic of nine resonators manufactured in the above-described manner was measured in a tube furnace. For that purpose the resonators were incorporated in a conventional oscillator circuit which will not be described in detail. The temperature was recorded with a chromel-alumel thermocouple. From the measured temperature and the measured frequency a best fit straight line was computed by means of the smallest quadrant method indicating the relationship between the frequency and the temperature. All straight lines obtained in this manner show the same variation as that shown in FIG. 4. The temperature coefficient is on an average 409 Hz/° C. In the temperature range between 50° C. and 275° C. the departure of the real frequency-temperature curve from the said straight line is less than 1° C.

For the other crystal cuts other temperature ranges will be found in which the frequency-temperature characteristic is predominantly linear.

For a cut angle $\theta$ of $-26°$ this is the temperature range from 20° C. to 80° C.

For a cut angle $\theta$ of $-23°$ this is the temperature range from $-20°$ C. to 150° C.

For a cut angle of $-28°$ this is the temperature range from $-25°$ C. to 95° C.

For satisfactory reproducibility it is of importance that, when a given cut angle has been chosen, the plates manufactured using this orientation should not depart by more than b 1.5' from said given angle.

What is claimed is:

1. A temperature sensor comprising a crystal resonator including a substantially plain-parallel plate cut from a quartz crystal formed using a crystal cut rotated singly through an angle $\theta$ about the electrical axis of the crystal, $\theta$ being in the range $-29°$ to $-16°$, first and second electrodes provided on respective major faces of the plate so as to make the plate vibrate in a thickness shear mode, and electronic oscillator means to generate and apply an electric field to the crystal resonator whereby the crystal resonator, in response to said electric field, will have a mode of vibration with a predominantly linear frequency-temperature characteristic over a selected temperature range.

2. A temperature sensor as claimed in claim 1, characterized in that the temperature range is from 20° C. to 80° C. and $\theta = -26°$.

3. A temperature sensor as claimed in claim 1, characterized in that the temperature range is from 0° C. to 150° C. and $\theta = 23°$.

4. A temperature sensor as claimed in claim 1, characterized in that the temperature range is from $-25°$ C. to 95° C. and 74 $= -28°$.

5. A temperature sensor as claimed in claim 1, characterized in that the temperature range is from 50° C. to 275° C. and $\theta = -17°$.

6. A crystal resonator for use in a temperature sensor providing a linear temperature versus frequency characteristic over a selected part of the temperature range of $-25°$ C. to $+275°$ C. comprising: a substantially plane-parallel plate of quartz crystal provided with first and second electrodes on respective major faces of the plate such that the plate will vibrate in a thickness shear mode in response to a high frequency electric field applied to the plate via said electrodes, and wherein the plate is formed from a crystal cut rotated singly through an angle $\theta$ about the X-axis of the crystal where $\theta$ is in the range of $-29°$ to $-16°$, whereby the crystal resonator will vibrate to produce a linear frequency-temperature characteristic over a selected part of said temperature range determined by the angle $\theta$.

7. A crystal resonator as claimed in claim 6 wherein for an angle $\theta$ of $-26°$ the selected part of the temperature range is from $+20°$ C. to $+80°$ C. for an angle $\theta$ of $-23°$ the selected part of the temperature range is from 0° C. to $+150°$ C., for an angle $\theta$ of $-28°$ the selected part of the temperature range is from $-25°$ C. to $+95°$ C., and for an angle $\theta$ of $-17°$ the selected part of the temperature range is from $+50°$ C. to $+275°$ C.

8. A crystal resonator as claimed in claim 6 wherein the angle $\theta$ is selected to be $-26°$, $-23°$ or $-28°$ and the quartz crystal plate is adapted to be supported within an environment whose temperature will vary over a selected part of said temperature range related to the choice of the angle $\theta$.

9. A temperature sensor for producing a linear frequency versus temperature characteristic over a selected part of the temperature range of $-25°$ C. to $+275°$ C. comprising; a plate-shaped quartz crystal resonator formed by means of a crystal cut rotated singly through an angle θ about the X-axis of the crystal where θ is in the range of −29° to −16°, first and second electrodes attached to opposing major faces of the crystal plate, means for mounting said crystal plate so that the plate will vibrate in a thickness shear mode in response to a high frequency electric field applied to the plate via said electrodes, and an oscillator circuit coupled to the crystal resonator plate for generating and applying said high frequency electric field thereto thereby to cause the crystal resonator plate to vibrate with a linear frequency versus temperature characteristic over a selected part of said temperature range determined by the angle θ.

10. A temperature sensor as claimed in claim 9 wherein θ is limited to the range of −28° to −23°.

11. A method of sensing temperature over a selected temperature range comprising the steps of: forming a plate-shaped quartz crystal resonator by using a crystal cut rotated singly through an angle θ about the X-axis of the crystal in the range of −29° to −16° or in the range of +39° to +45°, electrically coupling the crystal resonator to an oscillator circuit whereby the vibration frequency of the crystal resonator will vary linearly as a function of temperature over said selected temperature range or a given part thereof, and exposing said crystal resonator to an environment subject to a temperature variation over at least a part of said selected temperature range thereby to cause the frequency of the oscillator circuit to vary linearly with the temperature over said part of the selected temperature range whereby the temperature of said environment can be determined by measuring the frequency of the oscillator circuit.

12. A temperature sensing method as claimed in claim 11 further comprising: mounting the crystal resonator in said environment so that the crystal resonator will vibrate in a thickness shear mode, and measuring the frequency of the oscillator circuit to derive the temperature of said environment.

13. A temperature sensing method as claimed in claim 11 wherein the angle θ is limited to the range of −28° to −17° whereby the selected temperature range is between −25° C. and +275° C.

* * * * *

UNITED STATES PATENT AND TRADEMARK OFFICE
CERTIFICATE OF CORRECTION

PATENT NO. : 4,472,656
DATED : September 18, 1984
INVENTOR(S) : CORNELIS FRANX

It is certified that error appears in the above-identified patent and that said Letters Patent is hereby corrected as shown below:

In the Claims:

Claim 3, line 3, change " 23°" to -- -23° --

Claim 4, line 3, change "74" to -- θ --

Claim 7, line 3, after "C" (second occurrence) insert --,-- (comma)

Claim 8, line 2, after "-26°" change "." (period) to --,-- (comma)

Signed and Sealed this

Nineteenth Day of November 1985

[SEAL]

Attest:

DONALD J. QUIGG

Attesting Officer   Commissioner of Patents and Trademarks